United States Patent Office 3,238,209
Patented Mar. 1, 1966

3,238,209
(PHENYL-METHYLTHIO)ETHYL-PIPERAZINES AND RELATED COMPOUNDS
Michio Nakanishi and Tomio Muro, Oita, Japan, assignors to Yoshitomi Pharmaceutical Industries, Ltd., Osaka, Japan
No Drawing. Filed June 17, 1963, Ser. No. 288,448
Claims priority, application Japan, Feb. 22, 1961, 36/6,367
2 Claims. (Cl. 260—268)

The present application is a continuation-in-part of copending application Serial No. 172,864, filed February 13, 1962, now abandoned.

This invention relates to (phenyl-methylthio)ethyl-piperazines and to (phenyl-methylsulfonyl)ethyl-piperazines of the formula:

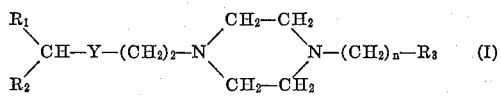

wherein each of $R_1$ and $R_2$ is phenyl, o-chlorophenyl or o-methylphenyl, $R_3$ is phenyl, lower alkyl-phenyl or hydrogen Y is S or $SO_2$, and $n$ is a whole number from 1 to 2 inclusive. Compounds I of the present invention are characterized and distinguished by a strong anti-ulcer action and by surprisingly low toxicity.

Compounds I of the present invention can be prepared by reacting a compound of the formula:

with a piperazine compound of the formula:

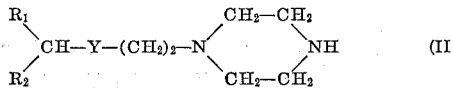

wherein $R_1$, $R_2$, $R_3$, Y and $n$ have the same significances as before, and X stands for a halogen atom, preferably Cl. By "lower alkyl" in the lower alkyl-phenyl variant of $R_3$ is meant alkyl with a maximum of four carbon atoms. When $R_3$ is hydrogen, the group $R_3$—$(CH_2)_n$— is methyl or ethyl, according to the value of $n$.

Compounds II can, for example, be prepared by the reaction between diarylmethylmercaptans and N-(ω-halogenoalkyl)-piperazines, by the reaction between diarylmethyl-(ω-halogenoalkyl) sulfides and piperazines, and by oxidizing into S-oxide type compounds the thus obtained sulfide compounds.

In preparing the new compounds I, piperazine derivatives of the Formula II are allowed to react with the compounds of the aforesaid formula $R_3$—$(CH_2)_nX$ preferably in the presence of a proton acceptor such as an alkali hydroxide or alkali carbonate. The reaction proceeds smoothly by heating and stirring in an organic solvent, or in a mixture of two or more organic solvents, such as benzene, toluene and xylene.

Illustrative of compounds I of the present invention are e.g.:
1-[2-(diphenylmethylthio)ethyl]-4-(o-methylbenzyl)-piperazine;
1-[2-(diphenylmethylthio)ethyl]-4-(phenylethyl)-piperazine;
1-[2-(diphenylmethylthio)ethyl]-4-(benzyl)-piperazine;
1-[2-(o-chlorophenylphenylthio)ethyl]-4-(o-methylbenzyl)-piperazine;
1-[2-(o-chlorophenylphenylmethylthio)ethyl]-4-(phenylethyl)-piperazine;
1-[2-(o-chlorophenylphenylmethylthio)ethyl]-4-(benzyl)-piperazine;
1-[2-(ditolylmethylthio)ethyl]-4-(o-methylbenzyl)-piperazine;
1-[2-(o-chlorophenylphenylmethylthio)ethyl]-4-ethyl-piperazine;
1-[2-(o-chlorophenylphenylmethylthio)ethyl]-4-methyl-piperazine;
1-[2-(diphenylmethylsulfonyl)ethyl]-4-(o-methylbenzyl)-piperazine;
1-[2-(diphenylmethylsulfonyl)ethyl]-4-(phenylethyl)-piperazine;
1-[2-(diphenylmethylsulfonyl)ethyl]-4-(benzyl)-piperazine;
1-[2-(o-chlorophenylphenylmethylsulfonyl)ethyl]-4-(o-methylbenzyl)-piperazine;
1-[2-(o-chlorophenylphenylmethylsulfonyl)ethyl]-4-(phenylethyl)-piperazine;
1-[2-(o-chlorophenylphenylmethylsulfonyl)ethyl]-4-(benzyl)-piperazine;
1-[2-(ditolylmethylsulfonyl)ethyl]-4-(o-methylbenzyl)-piperazine;
1-[2-(o-chlorophenylphenylmethylsulfonyl)ethyl]-4-ethylpiperazine;
1-[2-(o-chlorophenylphenylmethylsulfonyl)ethyl]-4-methylpiperazine;

Heretofore, the art has endeavored to synthesize a variety of piperazine derivatives. Among the piperazine derivatives available as anti-ulcer drugs, 1-[2-(orthochlorobenzhydryloxy)ethyl] - 4 - (ortho - methylbenzyl)piperazine, described in Belgian Patent No. 549,420, is well known. However, as is common with the "anti-ulcer" compounds known prior to the present invention, this compound has a high toxicity which militates against its use therapeutically.

The primary object of the present invention is the embodiment of N-substituted piperazine derivatives which have a strong anti-ulcer action and low toxicity when compared to known anti-ulcer drugs, e.g., the aforesaid 1-[2-(o-chlorobenzhydryloxy)ethyl] - 4 - (1-methylbenzyl)-piperazine. Thus, the intraperitoneal toxicity in mice of the sulfur compounds of the present invention is about three times less than the corresponding oxygen compound.

The N-substituted piperazine derivatives I of the present invention achieve this objective. Thus, they show remarkable and singular anti-ulcer effect, and furthermore, clinically they show a preventive and therapeutic effect for gastric or duodenal ulcer. More importantly, they have a remarkably low toxicity.

More concretely, for example, the compounds I reduce lesion incidences by the administration of one milligram per kilogram for experimental Shay ulcer or acute immobilization ulcer of rat.

The effect is greater than that shown by the administration of the same dose of 1-[2-(o-chlorobenzhydryloxy)-ethyl]-4-(o-methylbenzyl)-piperazine dihydrochloride.

Also $LD_{50}$ (when administered intraperitoneally in the mouse by the Litchfield-Wilcoxon method) averages 340 mg./kg. for the known compound, supra, while for the compounds of the present invention the average $LD_{50}$ is approximately three times higher, viz. about 850 mg./kg.

Investigation of the effect of the compounds of this invention for the amount and pH of gastric juice, and also the amount of hydrochloric acid in the gastric juice, in a dog with Pavlov's pouch, showed little variation in the levels of acidity, pH and free hydrochloric acid, and furthermore, no effect on the ileum of rats was observed by the Magnus method. Therefore, the anti-ulcer effect of the compounds is not ascribable to anticholinergic, antihistaminic or ganglion-blocking effect, but rather a novel type anti-ulcer effect is involved.

Still another object of the present invention is the embodiment of N-substituted piperazine derivatives, of the type of Formula I, which potentiate the hypnotic action of 5-(1-cyclohexen-1-yl)-1,5-dimethylbarbituric acid.

The administration of compounds I in an amount of 20 milligrams per kilogram of body weight induces ptosis, depression of spontaneous motor activity, etc. in dogs and prolongs the sleeping time of mice given an intraperitoneal injection of 5-(1-cyclohexen-1-yl)-1,5-dimethylbarbituric acid (hexobarbital) while the corresponding oxygen compound has no effect on the hypnotic action of hexobarbital.

For the purpose of giving those skilled in the art a better understanding of the invention, the following illustrative examples are given:

*Example 1*

20 milliliters of 5% sodium hydroxide solution are added to a solution of 5 grams of 1-[2-(diphenylmethylthio)-ethyl]-piperazine in 20 milliliters of benzene. The mixture is heated to 40–50° C., and thereto is added dropwise with stirring a solution of 2.3 grams of o-methylbenzyl chloride in 10 milliliters of benzene. After completion of the dropwise addition, stirring is continued for 20 minutes at the same temperature, then the mixture is refluxed for 1 hour under heating. After completion of the reaction the benzene solution is washed with water, dried over anhydrous sodium carbonate, and distilled to remove the solvent. The oily residue is acidified with 15 milliliters of 20% hydrogen chloride ethanol solution to give 5 grams of crude product: 1-[2-(diphenylmethylthio)ethyl] - 4 - (o-methylbenzyl)-piperazine dihydrochloride melting at 215–220° C. This product is recrystalized from methanol into platelets melting with decomposition at 228° C.

*Elementary analysis.*—Calculated for

C, 65.04%; H, 7.08%; N, 5.62%. Found: C, 64.84%; H, 7.26%; N, 5.63%.

*Example 2*

In a manner similar to that described in Example 1, 5.56 grams of 1-[2-(o-chlorophenylphenylmethylthio)ethyl]-piperazine are reacted with 20 milliliters of 5% sodium hydroxide solution and 2.3 grams of o-methylbenzyl chloride, and the reaction product is treated with hydrogen chloride ethanol solution to produce 6 grams of crude product: 1-[2-(o-chlorophenylphenylmethylthio)ethyl]-4-(o-methylbenzyl)-piperazine dihydrochloride melting at 210° C. This is recrystallized from ethanol into needles melting with decomposition at 215–217° C.

*Elementary analysis.*—Calculated for $C_{27}H_{33}N_2SCl_3$: C, 61.89%; H, 6.348%; N, 5.348%. Found: C, 61.54%; H, 6.34%; N, 5.33%.

*Example 3*

In a manner similar to that described in Example 1, 5 grams of 1-[2-(o - chlorophenylphenylmethylthio)ethyl]-piperazine are reacted with 20 milliliters of 5% sodium hydroxide solution and 2.3 grams of ethyl iodide, and the reaction product is treated with ethanolic hydrogen chloride solution to produce 4.5 grams of crude product: 1-[2 - (o - chlorophenylphenylmethylthio)ethyl]-4-(ethyl)-piperazine dihydrochloride melting at 220° C. When recrystallized from ethanol-ether mixed solvent, the product melts with decomposition at 230° C.

*Elementary analysis.*—Calculated for $C_{21}H_{33}N_2SCl_3$: C, 56.30%; H, 6.525%; N, 6.256%. Found: C, 55.90%; H, 6.34%; N, 6.47%.

*Example 4*

30 milliliters of 10% sodium hydroxide solution are added to a solution of 10 grams of 1-[2-(diphenylmethylsulfonyl)ethyl]-piperazine in 40 milliliters of benzene, the mixture is heated to 40–50° C. and thereto is added dropwise with vigorous stirring 4.5 grams of o-methylbenzyl chloride. After completion of the dropwise addition, stirring is continued for 30 minutes, then the mixture is refluxed for 1 hour under heating. After cooling the mixture, the benzene layer is washed with water, dried over anhydrous sodium sulfate and distilled to remove benzene. To the oily residue is added 50 milliliters of 20% ethanolic hydrogen chloride solution to yield, as crude product, 1-[2-(diphenylmethylsulfonyl)ethyl]-4-(o-methylbenzyl)-piperazine dihydrochloride as a white crystalline solid melting at 212° C. This is recrystallized from methanol to produce, as pure product, 1-[2-(diphenylmethylsulfonyl)ethyl] - 4 - (o-methylbenzyl)-piperazine dihydrochloride melting with decomposition at 214° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

Having thus disclosed the invention, what is claimed is:

1. 1 - [2 - (diphenylmethylsulfonyl)ethyl]-4-(o-methylbenzyl)-piperazine.
2. 1 - [α - (o-chlorophenyl)-benzylthio-ethyl]-4-(o-methylbenzyl)-piperazine.

References Cited by the Examiner

UNITED STATES PATENTS

| | | | |
|---|---|---|---|
| 3,079,306 | 2/1963 | Offe et al. | 260—239.1 |
| 3,116,291 | 12/1963 | Peterson et al. | 260—260 |

FOREIGN PATENTS

| | | |
|---|---|---|
| 203,501 | 5/1959 | Austria. |
| 203,504 | 5/1959 | Austria. |
| 549,420 | 5/1959 | Belgium. |

OTHER REFERENCES

Conant, The Chemistry of Organic Compounds, pp. 264, 520–523, New York, 1943.

Lowy et al., An Introduction to Organic Chemistry, 6th Ed., pp. 213–215, John Wiley and Sons, Inc., New York, 1945.

Burger, Medicinal Chemistry, 2nd Ed., pp. 77–78, Interscience Publishers, Inc., New York, 1960.

HENRY R. JILES, *Acting Primary Examiner.*

N. H. STEPNO, *Examiner.*

JAMES W. ADAMS, *Assistant Examiner.*